United States Patent [19]

Armond

[11] 4,129,424
[45] Dec. 12, 1978

[54] GAS SEPARATION

[75] Inventor: John W. Armond, Great Bookham, England

[73] Assignee: BOC Limited, London, England

[21] Appl. No.: 794,141

[22] Filed: May 5, 1977

[30] Foreign Application Priority Data

May 7, 1976 [GB] United Kingdom ............... 18926/76

[51] Int. Cl.$^2$ .............................................. B01D 53/00
[52] U.S. Cl. ............................................ 55/25; 55/58; 55/62; 55/68; 55/75; 55/389
[58] Field of Search ................... 55/75, 76, 68, 25, 58, 55/389, 62, 29

[56]  References Cited
U.S. PATENT DOCUMENTS

| 3,085,379 | 4/1963 | Kiyonaga et al. ....................... 55/75 |
| 3,176,444 | 4/1965 | Kiyonaga ................................. 55/75 |
| 3,313,091 | 4/1967 | Berlin ..................................... 56/75 |
| 3,430,418 | 3/1969 | Wagner ................................... 55/25 |
| 3,738,087 | 6/1973 | McCombs ............................... 55/58 |

Primary Examiner—Charles N. Hart
Assistant Examiner—E. Rollins Cross
Attorney, Agent, or Firm—Dennison, Dennison, Meserole & Pollack

[57]  ABSTRACT

Method and apparatus for separating gaseous mixtures using adsorbent material. The mixture is contacted with an adsorbent bed which adsorbs preferentially a desired product gas constituent of the mixture. The bed is then purged with such gas or a stream rich in such gas at a pressure substantially equal to the partial pressure of that gas in the gaseous mixture fed to the adsorbent bed. The bed is then regenerated to recover product gas.

8 Claims, 2 Drawing Figures

GAS SEPARATION

FIELD OF THE INVENTION

This invention relates to separation of gases. In particular it is concerned with recovery from an adsorbent of a gas that is preferentially adsorbed by the adsorbent material.

BACKGROUND OF THE INVENTION

It is known to purge a bed of adsorbent of gaseous impurities using product gas before recovering the preferentially adsorbed gas from such material, in order to achieve a better degree of purity of the desorbed product gas. During adsorption, a certain amount of the less readily adsorbed components of the feed gas mixture will remain in the interstices of the bed and indeed some of such components could also be loosely held by the adsorbent material. The object of the purge with product quality gas is to remove such components from the bed so that they are not withdrawn with the desorbed product gas as contaminants thereof. Another result of the purge operation is to achieve the saturation value for the adsorbent material with the preferentially adsorbed gas at the particular temperature and pressure of the bed after purging.

SUMMARY OF THE INVENTION

The invention provides a method of increasing the proportion of a gas in a gaseous mixture of which it is a constituent, which method comprises contacting the gaseous mixture with a bed of adsorbent which preferentially adsorbs said gas, purging the bed of adsorbent with said gas or a gas stream, which has a higher proportion of said gas than said gaseous mixture, at a pressure substantially equal to the partial pressure of said gas in the gaseous mixture before contact thereof with the bed of adsorbent, and then regenerating the bed to recover a gaseous product enriched in said gas.

The invention also provides apparatus capable of performing the above described method according to the invention.

The advantage of using a method and apparatus according to the invention is that by making the pressure of the bed during purging substantially the same as that of the partial pressure of the required product gas in the feed gaseous mixture, the amount of such gas required from the purge gas to saturate the bed during purging is kept to a minimum. It will be appreciated that after the adsorption step the bed will be substantially saturated with respect to the required product gas at the partial pressure of such gas in the gaseous mixture fed to the bed. In this way the amount of purge gas required to saturate the bed can be reduced substantially as compared with a similar process in which purging is carried out at a higher pressure than the aforesaid partial pressure thus providing a more economic process, and also without the risk of excessive amounts of adsorbed product gas being desorbed during purging as would be the case if the purging pressure is lower than the aforesaid partial pressure.

Preferably the bed is vented after the adsorption step to reduce its pressure to that of the purge gas. It is also preferred that such venting takes place in a co-current direction with respect to the direction through the bed of the feed gaseous mixture during the adsorption step. Preferably the adsorbent material is regenerated by reducing the pressure in the bed after the purge step. Such pressure reduction may be achieved either by connecting the bed to a zone at a lower pressure or by using a vacuum pump to evacuate the bed.

It is also preferred that the process is carried out using at least three adsorbent beds each operating on a similar cycle but out of phase with one another such that a substantially continuous flow of product gas can be obtained.

DETAILED DESCRIPTION

Figure 1:
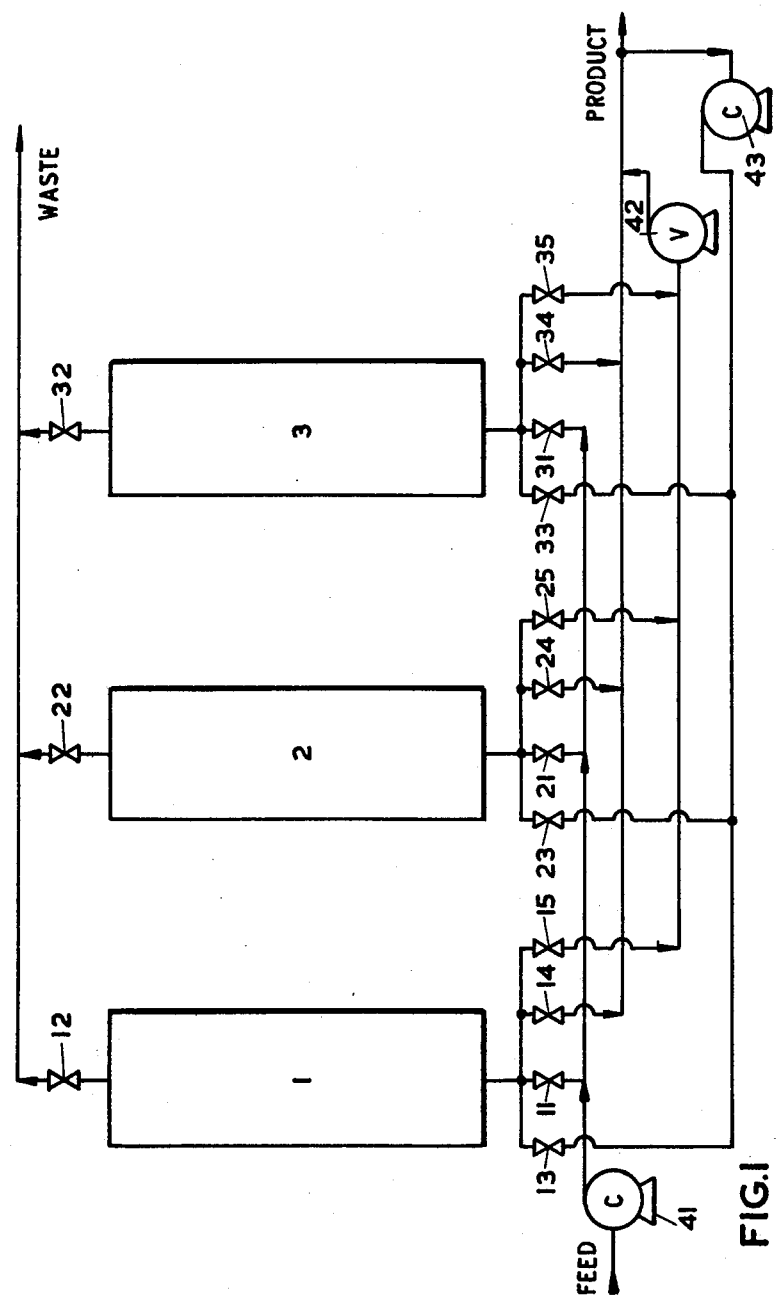
FIG. 1 is a diagrammatic representation of an apparatus suitable for performing a method according to the invention.

The apparatus illustrated in FIG. 1 includes three beds, 1, 2, 3 of an adsorbent material for example zeolite molecular sieve when air is the feedstock. Each bed operates on a similar three part cycle as shown in FIG. 2 with the cycles for each bed being out of phase with one another.

Considering bed 1, compressor 41 passes feed gaseous mixture, for example air, comprising a more readily adsorbed component (A), e.g. nitrogen, and a less readily adsorbed component (B). e.g. oxygen for a zeolite molecular sieve adsorbent, into the bed through valve 11 raising the pressure to P1, at which point valve 11 closes and valve 12 opens to cocurrently vent the bed to the purge pressure P2. The vented gas is rich in component B. Valve 13 opens and product quality A compressed to P2 by compressor 43 purges the bed at P2, component B with a lower proportion of component A than in the feed being discharged through valve 12 to waste. Valve 12 and valve 13 close, valve 14 opens to vent the first of the product A after which valve 14 closes and valve 15 opens for the remainder of the product A to be evacuated from the bed.

Purge pressure P2 is selected to be substantially the partial pressure of component A in the feedstock (A + B) fed by compressor 41 into the bed.

Figure 2:
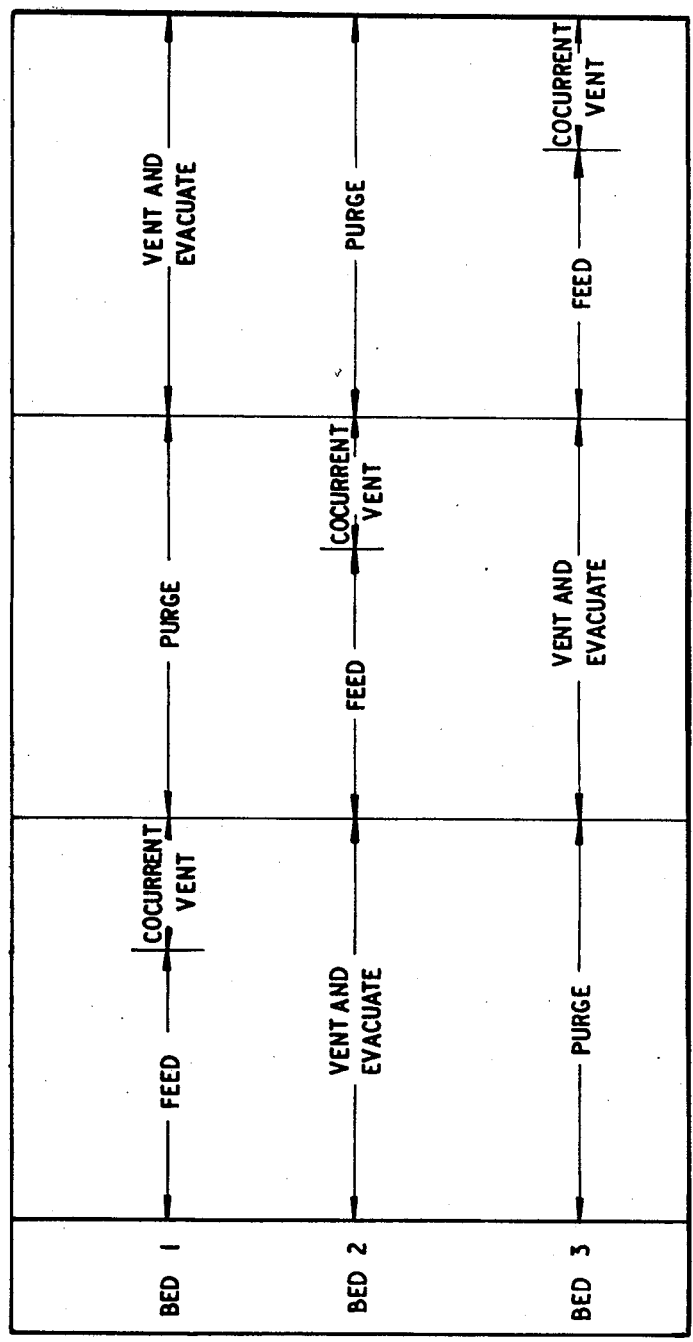
FIG. 2 is a diagram illustrating the cycle of operation of the apparatus of FIG. 1.

Beds 2 and 3 operate on the same cycle as bed 1 but 120° and 240° out of phase with bed 1 as shown in FIG. 2 to give continuous feed and product and good utilisation of the pumps.

Valves 23, 21, 24, 25 and 33, 31, 34, 35 are operated as corresponding valves 13, 11, 14, 15.

This process is applicable to nitrogen recovery from air using zeolite molecular sieve 5A adsorbent. However other gaseous mixtures can be separated using a method according to the invention, e.g. recovery of nitrous oxide from a mixture with nitrogen using a silica gel adsorbent material and of carbon monoxide from a mixture with hydrogen using a zeolite molecular sieve adsorbent. The recovery of carbon dioxide from combustion gas, activated carbon as the preferred adsorbent is also possible.

For methods according to the invention a vacuum pump may not be needed if the feedstock is at a relatively elevated pressure. For example, with a 85% nitrous oxide/nitrogen mixture at 11 bars, P2 would be about 9.3 bars.

What is claimed is:

1. A method for increasing the proportion of a gas in a gaseous mixture of which it is a constituent, which method consists essentially of sequentially contacting the gaseous mixture with a bed of adsorbent which preferentiallly adsorbs said gas, purging the bed of adsorbent with said gas or a gas stream, which has a higher proportion of said gas than said gaseous mixture, at a pressure substantially equal to the partial pressure of said gas in the gaseous mixture before contact thereof with the bed of adsorbent, and then regenerating the bed to recover a gaseous product enriched in said gas.

2. A method as claimed in claim 1 wherein the bed is vented after the adsorption step to reduce its pressure to that of the purge gas.

3. A method as claimed in claim 2 wherein such venting takes place in a co-current direction with respect to the direction through the bed of the feed gaseous mixture during the adsorption step.

4. A method as claimed in claim 1 wherein the adsorbent material is regenerated by reducing the pressure in the bed after the purge step.

5. A method as claimed in claim 4 wherein such pressure reduction is achieved either by connecting the bed to a zone at a lower pressure or by using a vacuum pump to evacuate the bed.

6. A method as claimed in claim 1 wherein at least three adsorbent beds are used each operating on a similar cycle but out of phase with one another such that a substantially continuous flow of product gas can be obtained.

7. A method as claimed in claim 1 wherein such purging takes place in a co-current direction with respect to the direction through the bed of the feed gaseous mixture during the adsorption step.

8. Apparatus for increasing the proportion of a gas in a gaseous mixture of which it is a constituent, which apparatus comprises a bed of adsorbent which preferentially adsorbs said gas, means to pass said gaseous mixture through the bed, means to pass through the bed a stream of said gas or a gas stream, which has a higher proportion of said gas than said gaseous mixture, means to regenerate the bed to recover a gaseous product enriched in said gas, and control means adapted to operate the aforesaid means such that the bed is purged with said gas or said gas stream at a pressure substantially equal to the partial pressure of said gas in the gaseous mixture.

* * * * *